(12) United States Patent
Smith et al.

(10) Patent No.: US 9,550,484 B2
(45) Date of Patent: Jan. 24, 2017

(54) SYSTEM AND METHOD FOR DETERMINING VEHICLE ORIENTATION IN A VEHICLE CONSIST

(71) Applicant: General Electric Company, Schenectady, NY (US)

(72) Inventors: Eugene Smith, Melbourne, FL (US); David Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 14/520,585

(22) Filed: Oct. 22, 2014

(65) Prior Publication Data

US 2016/0114819 A1 Apr. 28, 2016

(51) Int. Cl.
*B60T 13/66* (2006.01)
*B60T 17/22* (2006.01)
*B61L 25/02* (2006.01)
*B61L 15/00* (2006.01)

(52) U.S. Cl.
CPC ............ *B60T 13/665* (2013.01); *B60T 17/228* (2013.01); *B61L 15/0036* (2013.01); *B61L 15/0081* (2013.01); *B61L 25/028* (2013.01)

(58) Field of Classification Search
CPC .................................................. B61L 25/028
See application file for complete search history.

(56) References Cited

U.S. PATENT DOCUMENTS

| | | |
|---|---|---|
| 3,778,761 A | 12/1973 | Cribbins |
| 6,972,670 B2 | 12/2005 | LaDuc et al. |
| 7,715,956 B2 | 5/2010 | Bryant |
| 8,522,690 B2 | 9/2013 | Smith et al. |
| 2004/0267450 A1 | 12/2004 | Kernwein |
| 2006/0033611 A1* | 2/2006 | Froitzheim ......... B60C 23/0416 340/426.33 |
| 2009/0076669 A1 | 3/2009 | Krishnaswamy et al. |
| 2009/0248226 A1 | 10/2009 | Kellner et al. |
| 2012/0243375 A1 | 9/2012 | Melvin, II et al. |
| 2014/0372498 A1* | 12/2014 | Mian ....................... H04L 67/12 709/201 |

FOREIGN PATENT DOCUMENTS

EP 2236863 B1 11/2012

OTHER PUBLICATIONS

Office Action issued in connection with corresponding AU Application No. 2015-243113 on Jun. 28, 2016.

* cited by examiner

*Primary Examiner* — Todd Melton
(74) *Attorney, Agent, or Firm* — John A. Kramer; Global Patent Operation

(57) ABSTRACT

A system and method for determining an orientation of a vehicle are provided. The system and method determine (with a sensor assembly disposed onboard a first vehicle) a direction in which a fluid flows within the first vehicle. The first vehicle is included in a vehicle consist with a second vehicle. The orientation of the first vehicle relative to the second vehicle is determined based at least in part on the direction in which the fluid flows within the first vehicle. The fluid may be air in an air brake pipe of the vehicle consist.

20 Claims, 4 Drawing Sheets

SYSTEM AND METHOD FOR DETERMINING VEHICLE ORIENTATION IN A VEHICLE CONSIST

FIELD

Embodiments of the inventive subject matter described herein relate to vehicle consists.

BACKGROUND

Some known vehicle consists include several vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands. In order to ensure that the remote locomotives receive the commands, the lead locomotive may periodically re-communicate the commands until all of the remote locomotives confirm receipt of the commands by communicating a confirmation message to the lead locomotive.

In order to set up the consists to wirelessly communicate in this manner, an operator typically travels to and boards each individual remote locomotive in turn. While onboard each remote locomotive, the operator enters an orientation of the remote locomotive relative to the lead locomotive. This orientation is used to ensure that commands received at the remote locomotive from the lead locomotive are correctly interpreted. For example, if the lead and remote locomotives are facing the same (e.g., common) direction, then a command to move forward at a designated throttle setting may be implemented by the remote locomotive rotating wheels of the remote locomotive in the same direction as the lead locomotive. But, if the lead and remote locomotives are facing opposite directions, then the command to move forward may not be implemented by the remote locomotive moving the wheels of the remote locomotive in the same direction as the lead locomotive. Instead, the remote locomotive may need to rotate the wheels of the remote locomotive in the opposite direction to move the consist forward.

The orientations of the remote locomotives relative to the lead locomotives may be needed for correct operation of the consist. Using manual entry of the orientations, however, is time consuming and prone to human error. Entering an incorrect orientation can cause damage to the consists, such as when the incorrect orientation of a remote locomotive results in the lead and remote locomotives attempting to move in opposite directions. This can cause unsafe compression or stretching of the portion of the consist between the lead and remote locomotives.

BRIEF DESCRIPTION

In one embodiment, a method (e.g., for determining an orientation of a vehicle) includes determining (with a sensor assembly disposed onboard a first vehicle) a direction in which a fluid flows within the first vehicle that is included in a vehicle consist with a second vehicle, and determining an orientation of the first vehicle relative to the second vehicle based at least in part on the direction in which the fluid flows within the first vehicle.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

BRIEF DESCRIPTION OF THE DRAWINGS

Reference is now made briefly to the accompanying drawings, in which.

DETAILED DESCRIPTION

Figure 1:
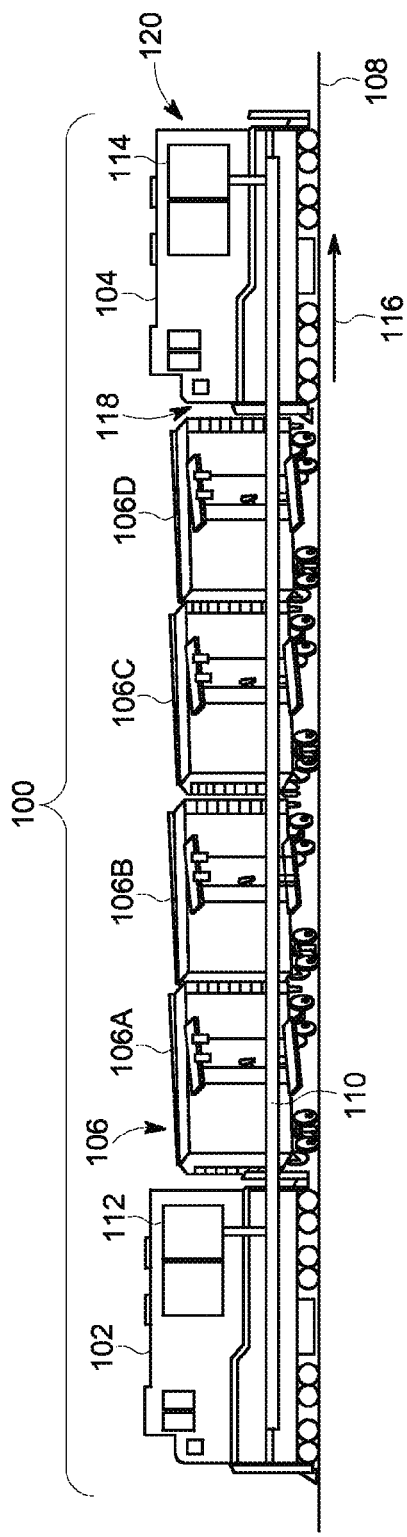
FIG. 1 is a schematic view of one embodiment of a vehicle consist.

One or more embodiments of the inventive subject matter described herein provide methods and systems for determining orientations of vehicles in a vehicle system having two or more vehicles. The vehicle system can include a vehicle consist with two or more propulsion-generating vehicles mechanically coupled with each other to travel together along a route. At least one of the propulsion-generating vehicles can remotely control operations of one or more other propulsion-generating vehicles in the vehicle consist. For example, the vehicle consist can include a rail vehicle consist having two or more locomotives mechanically coupled with each other by one or more other locomotives, rail cars, or the like. Optionally, other types of vehicles can be included in the consists, such as marine vessels, off-highway vehicles other than rail vehicles (e.g., mining vehicles or other vehicles that are not designed or legally permitted to travel on public roadways), or the like.

In setting up the vehicles in the vehicle consist to allow for at least one vehicle (e.g., a lead vehicle) to remotely control operations of one or more other vehicles in the vehicle consist (e.g., remote vehicles), the orientation of the remote vehicles relative to the lead vehicle may be determined so that commands send from the lead vehicle to the remote vehicle are correctly implemented. For example, the orientation of a remote vehicle may be input into a control unit of the remote vehicle and/or a lead vehicle so that, when a command signal is received from the lead vehicle or communicated from the lead vehicle, the command signal is interpreted by the remote vehicle to cause the remote vehicle to act to move in the same direction as the lead vehicle. If the lead and remote vehicle are facing the same direction (e.g., facing a common direction), then the command signal may be interpreted by the remote vehicle to cause a propulsion system of the remote vehicle to attempt to move in the same direction as the lead vehicle. With respect to vehicles having wheels, this may involve the remote vehicle rotating wheels of the remote vehicle in the same rotational direction (e.g., clockwise or counter-clockwise) as the lead vehicle. But, if the lead and remote vehicles are facing opposite directions, then the command signal may be interpreted differently to cause the propulsion system of the remote vehicle to attempt to move in the same direction as the lead vehicle. With respect to vehicles having wheels, this may involve the remote vehicle rotating wheels of the remote vehicle in the opposite rotational direction as the lead vehicle.

In one embodiment, the vehicle consist may be a distributed power (DP) vehicle consist, with the orientations of the remote vehicles being designated as "short hood forward" (e.g., the remote vehicle is facing forward along a direction of travel) or "long hood forward" (e.g., the remote vehicle is facing rearward away from the direction of travel). In order to properly control the direction of the remote vehicles, direction control logic may need to be configured at control units of the remote vehicles to represent which direction the remote vehicles are facing relative to the lead vehicle. In one aspect, the direction of air flow in brake pipes of remote vehicles during initialization of the vehicles for DP operations may be monitored to automatically determine and set the orientation of the remote vehicles in the control units based on the direction of air flow. During an initial release of an air brake system prior to a brake pipe test (where flow of the air through the brake pipe extending through the vehicle consist is examined to ensure that the brake pipe is continuous along the length of the vehicle consist), the lead vehicle feeds air to the vehicle consist (and remote vehicles) via the brake pipe. The direction that the air flows along the brake pipe and through the vehicles in the vehicle consist comes from the direction of the lead vehicle. The remote vehicles can have a directional air flow sensor installed in the brake pipe to monitor the direction of air flow in the brake pipe. When the lead vehicle initiates the air brake release in preparation for the brake pipe test, the remote vehicles can monitor the direction of air flow in the brake pipe. The direction of air flow that is detected in the brake pipe can then be used to define the direction that the remote vehicle is facing. This direction may be used to automatically configure a control unit of the remote vehicle, which uses the direction to implement commands received from the lead vehicle, as described above.

FIG. 1 is a schematic view of one embodiment of a vehicle consist 100. The illustrated vehicle consist 100 includes propulsion-generating vehicles 102, 104 and non-propulsion-generating vehicles 106 (e.g., vehicles 106A-D) mechanically coupled with each other. The propulsion-generating vehicles 102, 104 are capable of self-propulsion while the non-propulsion-generating vehicles 106 are not capable of self-propulsion. The propulsion-generating vehicles 102, 104 are shown as locomotives, the non-propulsion-generating vehicles 106 are shown as rail cars, and the vehicle consist 100 is shown as a train in the illustrated embodiment. Alternatively, the vehicles 102, 104 may represent other vehicles, such as automobiles, marine vessels, or the like, and the vehicle consist 100 can represent a grouping or coupling of these other vehicles. The number and arrangement of the vehicles 102, 104, 106 in the vehicle consist 100 are provided as one example and are not intended as limitations on all embodiments of the inventive subject matter described herein.

The vehicles 102, 104 can be arranged in a distributed power (DP) arrangement. For example, the vehicles 102, 104 can include a lead vehicle 102 that issues command messages to the other vehicles 104, which are referred to herein as remote vehicles. The designations "lead" and "remote" are not intended to denote spatial locations of the vehicles 102, 104 in the vehicle consist 100, but instead are used to indicate which vehicle 102, 104 is communicating (e.g., transmitting, broadcasting, or a combination of transmitting and broadcasting) operational command messages and which vehicles 102, 104 are being remotely controlled using the operational command messages. For example, the lead vehicle 102 may or may not be disposed at the front end of the vehicle consist 100 (e.g., along a direction of travel of the vehicle consist 100). Additionally, the remote vehicle 104 need not be separated from the lead vehicle 102. For example, the remote vehicle 104 may be directly coupled with the lead vehicle 102 or may be separated from the lead vehicle 102 by one or more other remote vehicles 104 and/or vehicles 106.

The operational command messages may include directives that direct operations of the remote vehicle 104. These directives can include propulsion commands that direct propulsion systems of the remote vehicle 104 to move in a designated location, at a designated speed, and/or power level, brake commands that direct the remote vehicles to apply brakes at a designated level, and/or other commands. The lead vehicle 102 issues the command messages to coordinate the tractive efforts and/or braking efforts provided by the vehicles 102, 104 in order to propel the vehicle consist 100 along a route 108, such as a track, road, waterway, or the like.

The vehicle consist 100 includes a fluid conduit 110 extending along a length of the vehicle consist 100. In one embodiment, the fluid conduit 110 extends through at least parts of the propulsion-generating vehicles 102, 104. The fluid conduit 110 can continuously extend through all of the propulsion-generating vehicles 102, 104 in the vehicle consist 100, or through less than all of the propulsion-generating vehicles 102, 104. The fluid conduit 110 can represent a brake pipe, such as an air brake pipe, or another conduit. For example, the fluid conduit 110 can hold air that is stored in the conduit 110 to prevent brake systems (described below) of the vehicles 102, 104 from engaging when the pressure of the air in the conduit 110 is sufficiently large. But, when the pressure in the conduit 110 falls below a designated threshold, the brake systems of the vehicles 102, 104 engage to slow or stop movement of the vehicle consist 100. The fluid (e.g., air or other fluid) may be added to the conduit 110 by a fluid source 112. The fluid source 112 may be a pump, reservoir, and/or the like, that supplies the fluid to the conduit 110. The fluid source 112 is shown as being disposed onboard the lead vehicle 102, but optionally may be disposed in another location of the vehicle consist 100.

During set up of the vehicles 102, 104 for operation as the vehicle consist 100, brake systems of the vehicle consist 100 may be tested by reducing the fluid pressure in the conduit 110 to see if the brake systems onboard the vehicles 102, 104 are engaged. The fluid source 112 may then be activated to at least partially fill the conduit 110 with fluid (e.g., air). As the conduit 110 is at least partially filled with fluid, the fluid may flow from the fluid source 112 along the length of the conduit 110.

The flow of this fluid in the conduit 110 may be sensed by one or more sensor assemblies 114 in one or more of the remote vehicles 104. The sensor assembly 114 can detect which direction the fluid is flowing in the conduit 110 within the remote vehicle 104. Based on this direction, the remote vehicle 104 can determine the orientation of the remote vehicle 104. For example, in the illustrated embodiment, the sensor assembly 114 can detect that the fluid is flowing in the conduit 110 in a direction 116 that points from a front end 118 of the remote vehicle 104 toward an opposite, back end 120 of the remote vehicle 104. A control unit (described below) of the remote vehicle 104 can determine, based at least in part on this detected fluid flow, that the front end 118 of the remote vehicle 104 is facing the lead vehicle 102 and/or that the back end 120 of the remote vehicle 104 is facing away from the lead vehicle 102. The control unit of the remote vehicle 104 may be programmed with the orientation of the lead vehicle 102 (e.g., which direction the front end and/or back end of the lead vehicle 102 is facing) so that the control unit can automatically determine the orientation of the remote vehicle 104 relative to the lead vehicle 102 based at least in part on the direction of fluid flow in the conduit 110. In the illustrated embodiment, the control unit can determine that the lead vehicle 102 and the remote vehicle 104 are facing the same direction.

Figure 2:
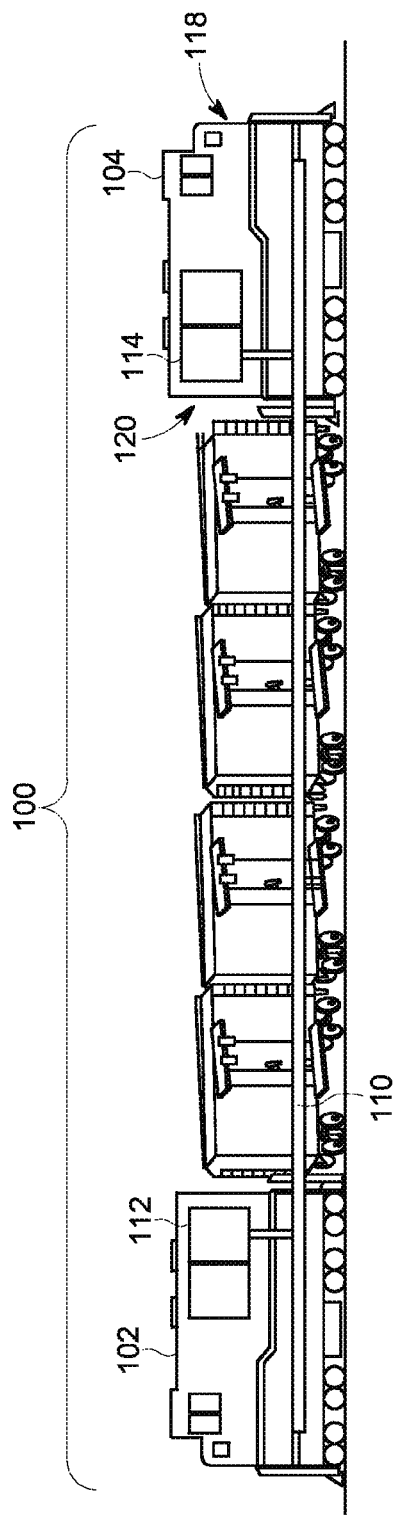
FIG. 2 is a schematic view of another embodiment of the vehicle consist shown in FIG. 1.

FIG. 2 is a schematic view of another embodiment of the vehicle consist 100. In contrast to the embodiment shown in FIG. 1, the vehicle consist 100 in FIG. 2 includes the remote vehicle 104 facing in an opposite direction (e.g., away from the lead vehicle 102). As the fluid source 112 at least partially fills the conduit 110 with fluid, the fluid may flow from the fluid source 112 along the length of the conduit 110 toward the remote vehicle 104.

The flow of the fluid in the conduit 110 is sensed by the sensor assembly 114 in the remote vehicle 104. Based on this direction, the remote vehicle 104 can determine the orientation of the remote vehicle 104. In the illustrated embodiment, the sensor assembly 114 can detect that the fluid is flowing in the conduit 110 in the direction 116 that now points from the back end 120 of the remote vehicle 104 toward the front end 118 of the remote vehicle 104. While the fluid may flow in the same direction as in the embodiment shown in FIG. 1, because the remote vehicle 104 is facing an opposite direction, the sensor assembly 114 can determine that the flow of the fluid in the conduit 110 is in an opposite direction in the remote vehicle 104 when compared to the orientation shown in FIG. 1. The control unit of the remote vehicle 104 may be programmed with the orientation of the lead vehicle 102 so that the control unit can automatically determine that the lead vehicle 102 and the remote vehicle 104 are facing opposite directions.

Figure 3:
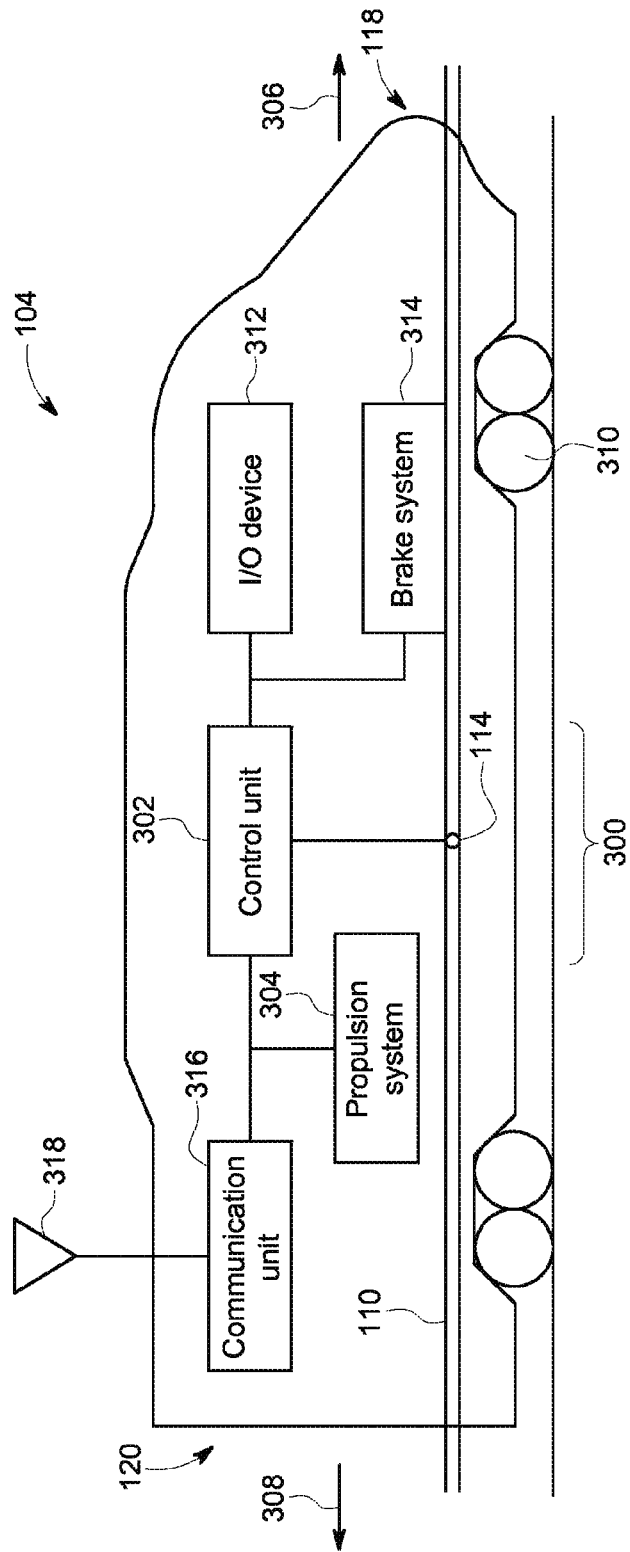
FIG. 3 is a schematic diagram of a remote vehicle shown in FIG. 1 in accordance with one embodiment.

FIG. 3 is a schematic diagram of the remote vehicle 104 shown in FIG. 1 in accordance with one embodiment. The vehicle 104 includes a monitoring system 300 that determines the orientation of the vehicle 104 relative to another vehicle 102 (shown in FIG. 1) in the same vehicle consist 100 (shown in FIG. 1) based at least in part on the direction of fluid flow in the fluid conduit 110 extending into and/or through the vehicle 104. The monitoring system 300 includes the sensor assembly 114 and a control unit 302. The control unit 302 can include or represent one or more hardware circuits or circuitry that include, are connected with, or that both include and are connected with one or more processors, controllers, or other hardware logic-based devices. The control unit 302 can be used to control movement of the vehicle 104, such as by receiving command signals from the lead vehicle 102 and determining how to control a propulsion system 304 to implement the command signals. For example, the control unit 302 can receive a command signal that instructs the control unit 302 to move the remote vehicle 104 in a first direction 306 or an opposite, second direction 308. The control unit 302 can refer to an orientation of the remote vehicle 104 that is determined based on the direction of fluid flow in the conduit 110 (as described above) and determine how to control the propulsion system 304 in order to implement the command signal (e.g., how to cause the remote vehicle 104 to move in the direction instructed by the command signal).

The propulsion system 304 includes one or more engines, alternators, generators, batteries, transformers, motors (e.g., traction motors), gears, transmissions, axles, or the like, that work to generate movement of the vehicle 104. The propulsion system 304 is controlled by the control unit 302 to move the vehicle 104. In the illustrated embodiment, the propulsion system 304 is operatively connected with wheels 310 of the vehicle 104 to rotate the wheels 310 and cause movement of the vehicle 104. Based on the command signal received at the remote vehicle 104 and the orientation of the vehicle 104, the control unit 302 can determine how to instruct the propulsion system 304 to move the vehicle 104. For example, if the command signal instructs the vehicle 104 to move in the direction 306, then the control unit 302 can refer to the orientation of the vehicle 104 that is determined from the fluid flow in the conduit 110 to determine if the front end 118 is facing toward or away from the direction 306 (and/or if the back end 120 is facing toward or away from the direction 306). In the illustrated embodiment, the control unit 302 can control the propulsion system 304 to rotate the wheels 310 in a clockwise direction to move the vehicle 104 in the direction 306. But, if the command signal instructs the vehicle 104 to move in the direction 308, then the control unit 302 can refer to the orientation of the vehicle 104 to rotate the wheels 310 in a counter-clockwise direction to move the vehicle 104 in the direction 308.

The sensor assembly 114 can represent one or more sensors that generate output (e.g., one or more data signals) that is communicated to the control unit 302 and that represents the direction in which fluid flows in the conduit 110. In one aspect, the sensor assembly 114 can represent one or more air flow meters, mass flow meters, or the like, that are disposed inside the conduit 110 to detect a direction of the flow of the fluid in the conduit 110. In another aspect, the sensor assembly 114 can represent two or more sensors that measure characteristics of the fluid flowing in the conduit 110 to determine the direction of fluid flow in the conduit 110. For example, the sensor assembly 114 can include two or more pressure transducers or other sensors that are sensitive to pressure in the conduit 110. These transducers can be spaced apart sufficiently far that, as the fluid flows into the conduit 110, a difference in pressure exists in the conduit 110 between the locations of the transducers. This pressure differential can be output by the sensor assembly 114 to the control unit 302, and the control unit 302 can examine the pressure differential to determine which direction the fluid is flowing in the conduit 110. For example, the measured pressure may be larger upstream of the direction of fluid flow in the conduit 110 than downstream of the direction of fluid flow.

In another embodiment, the sensor assembly 114 represents one or more sensors disposed on the outside (e.g., exterior surface) of the conduit 110. These sensors can monitor one or more characteristics of the conduit 110, and changes in the one or more characteristics can be examined by the control unit 302 to determine which direction the fluid is flowing in the conduit 110. In one aspect, the one or more characteristics can include strain of the conduit 110. The strain of the conduit 110 can increase as the fluid is filling the conduit 110. If the strain is larger in one section of the conduit 110 than another, then the location of the larger strain relative to the location of the smaller strain (e.g., as measured by different sensors, such as strain gauges) can indicate the direction in which the fluid is flowing (e.g., flowing from the location of larger strain to the location of smaller strain).

In another aspect, the one or more characteristics can include temperatures of the conduit 110. The temperature of the conduit 110 can change as the fluid is filling the conduit 110 and can be monitored by the sensor assembly 114 (which can include thermocouples or other temperature-sensitive devices). Changes in the temperature can be compared with directions in which the fluid is flowing in the conduit 110, and these changes and corresponding fluid flow directions can be stored in the control unit 302 (or a memory that is accessible to the control unit 302). The control unit 302 can monitor the temperature changes detected by the sensor assembly 114 and determine which direction the fluid is flowing in the conduit 110 from the temperature changes.

In another aspect, the one or more characteristics can include sounds of the conduit 110. The flow of fluid in the conduit 110 can generate audible sounds that are detected by the sensor assembly 114 (which can include microphones or other devices that are sensitive to sound). Sounds generated by the flow of fluid in the conduit 110 can be previously examined, and these sounds and corresponding fluid flow directions can be stored in the control unit 302 (or a memory that is accessible to the control unit 302). The control unit 302 can monitor the sounds detected by the sensor assembly 114 and determine which direction the fluid is flowing in the conduit 110 from the sounds.

The vehicle 104 also includes one or more input and/or output devices 312 ("I/O device" in FIG. 3). The control unit 302 can receive manual input from an operator of the vehicle 104 through the I/O device 312, which may include a touchscreen, keyboard, electronic mouse, microphone, or the like. For example, the control unit 302 can receive manually input changes to the tractive effort, braking effort, speed, power output, and the like, from the I/O device 312. The control unit 302 can present information to the operator using the I/O device 312, which can include a display screen (e.g., touchscreen or other screen), speakers, printer, or the like.

The control unit 302 can automatically input the orientation of the vehicle 104 relative to the lead vehicle 102 without operator intervention in one embodiment. For example, based on the direction of fluid flow in the conduit 110, the control unit 302 can determine the orientation of the vehicle 104 and use this orientation to determine how to implement command messages received from the lead vehicle 102 without operator intervention. Alternatively, the control unit 302 can determine the orientation of the vehicle 104 based on the direction of fluid flow and communicate the orientation to an onboard operator via the I/O device 312 and/or to an operator disposed onboard the lead vehicle 102 for confirmation of the orientation by the operator.

The control unit 302 is operatively connected with a brake system 314 of the vehicle 104. The brake system 314 can include and/or be fluidly coupled with the conduit 110. As described above, changes in the fluid pressure in the conduit 110 can engage or disengage the brake system 314. The control unit 302 also is operatively connected with a communication unit 316. The communication unit 316 includes or represents hardware and/or software that is used to communicate with other vehicles 102 in the vehicle consist 100. For example, the communication unit 316 may include an antenna 318, a transceiver, and/or associated circuitry for wirelessly communicating (e.g., communicating and/or receiving) command messages described above.

Figure 4:
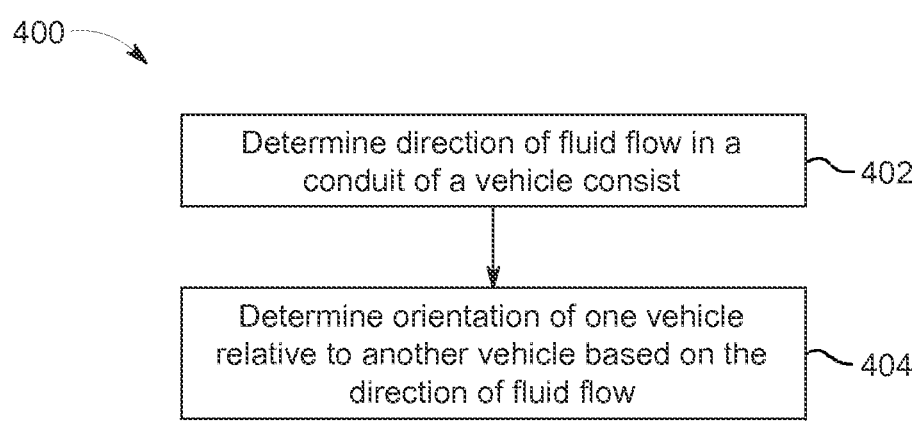
FIG. 4 illustrates a flowchart of a method for determining vehicle orientation according to one embodiment.

FIG. 4 illustrates a flowchart of a method 400 for determining vehicle orientation according to one embodiment. The method 400 can be performed by the monitoring system 300 shown in FIG. 3. At 402, a direction of fluid flowing in the conduit 110 (shown in FIG. 1) of the vehicle consist 100 (shown in FIG. 1) is determined. As described above, the direction of fluid flow can be measured in a location that is onboard the remote vehicle 104 (shown in FIG. 1). Optionally, the direction of the fluid flow can be determined before the vehicle consist 100 leaves to travel along the route 108 (shown in FIG. 1). For example, the direction of the fluid flow can be determined while the vehicle consist 100 is stationary. At 404, the orientation of the remote vehicle 104 relative to another vehicle (e.g., the lead vehicle 102) is determined based at least in part on the direction of fluid flow. For example, the orientation can be determined as facing the same or opposite direction as the lead vehicle 102.

As described above, this orientation can be used to determine how to implement command messages received by the lead vehicle 102 to prevent the remote vehicle 104 from working in an attempt to move the remote vehicle 104 in an opposite direction as the lead vehicle 102. Instead, the orientation can be used to ensure that the remote vehicle 104 works to move the remote vehicle 104 in the same direction as the lead vehicle 102. In one embodiment, the vehicles 102, 104 may be communicatively linked with each other to allow the lead vehicle 102 to remotely control movement of the remote vehicle 104. The vehicles 102, 104 may be communicatively linked with each other using the orientation that is determined. For example, the vehicle 104 may not accept command messages from the vehicle 102 until the orientation of the vehicle 104 is determined.

In one embodiment, a method (e.g., for determining an orientation of a vehicle) includes determining (with a sensor assembly disposed onboard a first vehicle that is included in a vehicle consist with a second vehicle) a direction in which a fluid flows within the first vehicle, and determining an orientation of the first vehicle relative to the second vehicle based at least in part on the direction in which the fluid flows within the first vehicle.

In one aspect, the fluid is in a brake system of the first vehicle.

In one aspect, determining the direction in which the fluid flows within the first vehicle occurs prior to the vehicle consist moving.

In one aspect, the orientation of the first vehicle represents whether the first vehicle and the second vehicle are facing a common direction or opposite directions.

In one aspect, the vehicle consist includes an air brake system that extends into the first vehicle and the second vehicle. Determining the direction in which the fluid flows can include determining the direction in which the fluid flows in the air brake system from the second vehicle to the first vehicle.

In one aspect, the method also includes communicatively linking the first vehicle with the second vehicle using the orientation that is determined so that the second vehicle can remotely control operation of the first vehicle.

In one aspect, determining the direction in which the fluid flows includes monitoring flow of the fluid using a sensor assembly that is disposed inside a brake pipe of the first vehicle.

In one aspect, determining the direction in which the fluid flows includes measuring one or more characteristics of a brake pipe of the first vehicle in a location that is external to the brake pipe and monitoring a change in the one or more characteristics of the brake pipe. The direction in which the fluid flows can be based at least in part on the change in the one or more characteristics of the brake pipe.

In one aspect, the one or more characteristics include at least one of strain, temperature, or sound.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In one aspect, the fluid is in a brake system of the first vehicle.

In one aspect, the one or more processors are configured to determine the direction in which the fluid flows within the first vehicle prior to the vehicle consist moving.

In one aspect, the one or more processors are configured to determine the orientation of the first vehicle as an indication of whether the first vehicle and the second vehicle are facing a common direction or opposite directions.

In one aspect, the vehicle consist includes an air brake system that extends into the first vehicle and the second vehicle. The one or more processors can be configured to determine the direction in which the fluid flows in the air brake system from the second vehicle to the first vehicle based on the output generated by the sensor assembly.

In one aspect, the one or more processors are configured to communicatively link the first vehicle with the second vehicle using the orientation that is determined so that the second vehicle can remotely control operation of the first vehicle.

In one aspect, the sensor assembly is configured to be disposed inside a brake pipe of the first vehicle and to generate the output based at least in part on the direction in which the fluid flows in the brake pipe.

In one aspect, the sensor assembly is configured to generate the output by measuring one or more characteristics of a brake pipe of the first vehicle in a location that is external to the brake pipe. The one or more processors can be configured to monitor the output generated by the sensor assembly for a change in the one or more characteristics of the brake pipe, wherein the one or more processors are configured to determine the direction in which the fluid flows based at least in part on the change in the one or more characteristics of the brake pipe.

In one aspect, the one or more characteristics include at least one of strain, temperature, or sound.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

In one aspect, identifying the direction of air flow occurs onboard the first vehicle.

In another embodiment, a method comprises determining, with a sensor assembly disposed onboard a first vehicle that is included in a vehicle consist with a second vehicle, a direction in which a fluid flows within the first vehicle. The method further comprises determining an orientation of the first vehicle relative to the second vehicle based at least in part on the direction in which the fluid flows within the first vehicle. The first vehicle includes a first end, a distal second end, a first coupler located at the first end of the first vehicle and configured for selective coupling of the first vehicle to the second vehicle, and a second coupler located at the second end of the first vehicle and configured for selective coupling of the first vehicle to the second vehicle. (Selective coupling means the first and second ends of a vehicle are configured to be coupled to either of the first and second ends of another vehicle.) The second vehicle includes a first end, a distal second end, a third coupler located at the first end of the second vehicle and configured for selective coupling of the second vehicle to the first vehicle, and a fourth coupler located at the second end of the second vehicle and configured for selective coupling of the second vehicle to the first vehicle. The vehicle consist is operational for movement along a common direction of a route (e.g., along rails if the vehicle consist is a train or other rail vehicle consist) both when the first end of the second vehicle is coupled to the second end of the first vehicle such that the first end of the first vehicle and the first end of the second vehicle are facing in the common direction, and when the second end of the second vehicle is coupled to the second end of the first vehicle such that the first end of the first vehicle is facing in the common direction and the first end of the second vehicle is facing opposite the common direction. The orientation of the first vehicle that is determined relative to the second vehicle is whether the first end of the first vehicle and the first end of the second vehicle are facing in the common direction or whether the first end of the first vehicle is facing in the common direction and the first end of the second vehicle is facing opposite the common direction. That is, in instances where the orientation is unknown (e.g., unknown to a processor-based system configured to carry out the method), it is determined that the first end of the first vehicle and the first end of the second vehicle are facing in the common direction, when in actuality they are facing in the common direction, and it is determined that the first end of the first vehicle is facing in the common direction and the first end of the second vehicle is facing opposite the common direction, when in actuality that is the case. The fluid may be a brake system fluid, and in embodiments, the orientation is determined when the vehicles are not moving, e.g., are not moving yet but a control sequence has been initiated for the vehicles to commence moving at a future point in time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose message processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
    determining, with a sensor assembly disposed onboard a first vehicle that is included in a vehicle consist with a second vehicle, a direction in which a fluid flows within the first vehicle; and
    determining an orientation of the first vehicle relative to the second vehicle based at least in part on the direction in which the fluid flows within the first vehicle.

2. The method of claim 1, wherein the fluid is in a brake system of the first vehicle.

3. The method of claim 1, wherein determining the direction in which the fluid flows within the first vehicle occurs prior to the vehicle consist moving.

4. The method of claim 1, wherein the orientation of the first vehicle represents whether the first vehicle and the second vehicle are facing a common direction or opposite directions.

5. The method of claim 1, wherein the vehicle consist includes an air brake system that extends into the first vehicle and the second vehicle, and determining the direction in which the fluid flows includes determining the direction in which the fluid flows in the air brake system from the second vehicle to the first vehicle.

6. The method of claim 1, further comprising communicatively linking the first vehicle with the second vehicle using the orientation that is determined so that the second vehicle can remotely control operation of the first vehicle.

7. The method of claim 1, wherein determining the direction in which the fluid flows includes monitoring flow of the fluid using a sensor of the sensor assembly that is disposed inside a brake pipe of the first vehicle.

8. The method of claim 1, wherein determining the direction in which the fluid flows includes measuring one or more characteristics of a brake pipe of the first vehicle in a location that is external to the brake pipe and monitoring a change in the one or more characteristics of the brake pipe, wherein the direction in which the fluid flows is based at least in part on the change in the one or more characteristics of the brake pipe.

9. The method of claim 8, wherein the one or more characteristics include at least one of strain, temperature, or sound.

10. A system comprising:
    a sensor assembly configured to generate an output representative of a direction in which a fluid flows within a first vehicle that is included in a vehicle consist with a second vehicle; and
    one or more processors configured to determine an orientation of the first vehicle relative to the second vehicle based at least in part on the output generated by the sensor assembly.

11. The system of claim 10, wherein the fluid is in a brake system of the first vehicle.

12. The system of claim 10, wherein the one or more processors are configured to determine the direction in which the fluid flows within the first vehicle prior to the vehicle consist moving.

13. The system of claim 10, wherein the one or more processors are configured to determine the orientation of the first vehicle as an indication of whether the first vehicle and the second vehicle are facing a common direction or opposite directions.

14. The system of claim 10, wherein the vehicle consist includes an air brake system that extends into the first vehicle and the second vehicle, and the one or more processors are configured to determine the direction in which the fluid flows in the air brake system from the second vehicle to the first vehicle based on the output generated by the sensor assembly.

15. The system of claim 10, wherein the one or more processors are configured to communicatively link the first vehicle with the second vehicle using the orientation that is determined so that the second vehicle can remotely control operation of the first vehicle.

16. The system of claim 10, wherein the sensor assembly is configured to be disposed inside a brake pipe of the first vehicle and to generate the output based at least in part on the direction in which the fluid flows in the brake pipe.

17. The system of claim 10, wherein the sensor assembly is configured to generate the output by measuring one or more characteristics of a brake pipe of the first vehicle in a location that is external to the brake pipe, and wherein the one or more processors are configured to monitor the output generated by the sensor assembly for a change in the one or more characteristics of the brake pipe, wherein the one or more processors are configured to determine the direction in which the fluid flows based at least in part on the change in the one or more characteristics of the brake pipe.

18. The system of claim 17, wherein the one or more characteristics include at least one of strain, temperature, or sound.

19. A method comprising:
  identifying a direction of air flow in an air brake pipe of a vehicle consist having a first vehicle and a second vehicle; and
  determining an orientation of the first vehicle relative to the second vehicle in the vehicle consist based at least in part on the direction of the air flow in the air brake pipe.

20. The method of claim 19, wherein identifying the direction of air flow occurs onboard the first vehicle.

* * * * *